United States Patent

Tajima et al.

[11] Patent Number: 5,886,820
[45] Date of Patent: Mar. 23, 1999

[54] POLARIZING GLASS AND PRODUCTION PROCESS THEREOF

[75] Inventors: Hidemi Tajima, Tokyo; Takeshi Takahashi, Yamanashi, both of Japan

[73] Assignee: Hoya Corporation, Tokyo, Japan

[21] Appl. No.: 578,943

[22] Filed: Dec. 27, 1995

[30] Foreign Application Priority Data

Dec. 27, 1994 [JP] Japan .................................. 6-324249

[51] Int. Cl.$^6$ ...................................................... G02B 5/30
[52] U.S. Cl. ........................ 359/492; 359/485; 359/900; 372/703; 65/32.5
[58] Field of Search .................................. 359/492, 485, 359/490, 900, 484; 65/32.5; 372/703

[56] References Cited

U.S. PATENT DOCUMENTS

| | | | |
|---|---|---|---|
| 2,319,816 | 5/1943 | Land .................................... | 359/490 |
| 2,340,476 | 2/1944 | Keim ................................... | 359/492 |
| 3,653,863 | 4/1972 | Araujo et al. ....................... | 359/492 |
| 3,954,485 | 5/1976 | Seward, III et al. ................ | 65/33 |
| 4,204,027 | 5/1980 | Simon .................................. | 428/428 |
| 4,282,022 | 8/1981 | Lo et al. ............................. | 65/85 |
| 4,304,584 | 12/1981 | Borrelli et al. ..................... | 65/30.11 |
| 4,339,256 | 7/1982 | Simms ................................ | 65/32 |
| 4,479,819 | 10/1984 | Borelli et al. ..................... | 65/30.11 |
| 4,486,213 | 12/1984 | Lentz et al. ........................ | 65/30.11 |
| 4,908,054 | 3/1990 | Jones et al. ........................ | 65/30.11 |
| 5,375,009 | 12/1994 | Otani et al. ........................ | 359/282 |
| 5,430,573 | 7/1995 | Araujo et al. ...................... | 359/361 |
| 5,517,356 | 5/1996 | Araujo et al. ...................... | 359/490 |

FOREIGN PATENT DOCUMENTS

| | | | |
|---|---|---|---|
| A0105701 | 4/1984 | European Pat. Off. ........ | C03B 17/00 |
| 56-169140 | 12/1981 | Japan ............................. | C03B 32/00 |
| 2-40619 | 9/1990 | Japan ............................. | C03C 4/00 |
| A 5-150117 | 6/1993 | Japan ............................. | 359/495 |
| 5-208844 | 8/1993 | Japan ............................. | C03C 4/00 |
| A2075002 | 11/1981 | United Kingdom ........... | C03C 19/00 |

OTHER PUBLICATIONS

Abstract: JP 40 5208844 A "Polarizing Glass Containing Copper and its Production" Hoya Corp., Japan, 20 Aug. 1993.

*Primary Examiner*—Cassandra Spyrou
*Assistant Examiner*—John Juba, Jr.
*Attorney, Agent, or Firm*—Burns, Doane, Swecker & Mathis, L.L.P.

[57] ABSTRACT

Disclosed are a polarizing glass comprising a glass layer(s) which contains shape-anisotropic metallic particles dispersed therein in an oriented state and a base glass which causes substantially no light scattering, said glass layer being provided on a part or whole of at least one of faces of said base glass, which has polarizing properties comparable to conventional counterparts, a largely decreased transmission loss and a strength acceptable to practical use. Processes for the production of the polarizing glass are also disclosed.

15 Claims, 5 Drawing Sheets

POLARIZING GLASS AND PRODUCTION PROCESS THEREOF

BACKGROUND OF THE INVENTION

1. Field of the Invention

The present invention relates to polarizing glass articles suitable for use in microisolators which are applicable in optical communication utilizing semiconductor lasers and optical fibers.

2. Related Art

Polarizing glasses which contain uniaxially oriented metallic particles having a large aspect ratio dispersed therein have already been known. Japanese Patent Application Laid Open [JP-A-] No. 56-169140 (hereinafter referred to as "prior art 1"), for example, discloses a process for the production of a polarizing glass, which comprises the steps of stretching a glass containing silver halide particles such as AgCl, AgBr or AgI, and then reducing the stretched glass in a reducing atmosphere of 300° C. or more, whereby uniaxially elongated metal silver particles are precipitated to afford a polarizing glass.

Japanese Patent Application Laid Open [JP-A-] No. 5-208844 (hereinafter referred to as "prior art 2") discloses a polarizing glass and the production process thereof, which comprises bringing about the precipitation of copper halide particles such as CuCl, CuBr or CuI in the glass, stretching and reducing the resultant glass to obtain a polarizing glass which contains uniaxially stretched metallic copper particles precipitated therein.

Japanese Patent Application Laid Open [JP-A-] No. 59-83951 (hereinafter referred to as "prior art 3") discloses a polarizing glass and the production process thereof, according to which, in order to avoid the glass to break due to concentrated tensile stress near the glass surface, a potential polarizing glass which contains unprecipitated and unstretched metallic particles and is called "core glass" is coated with a glass having much lower viscosity, whereby obtaining a photochromic polarizing glass in which tensile stress is scarcely present near the surface of the stretched article.

The polarizing glasses disclosed in prior art 1 and prior art 2 are produced by stretching a metallic halide-containing glass and then maintaining the stretched glass at an elevated temperature in a reducing atmosphere to precipitate metallic particles. In such processes, however, in the inner part of the glass, metallic halide particles remain almost in the unreduced state and consequently the precipitated metallic particles are present only in the surface layer having an extremely small thickness. Metallic halides remained in the glass give no contribution to polarizing properties of the glass. On the contrary, metallic halide particles, since having a refractive index different from that of base glass therearound, may cause light scattering and hence transmission loss due to the scattering of a part of incident light.

Moreover, metallic halide is partially ionized in the glass. Ionized metals absorb the light of specific wavelength ranges and this may cause additional transmission loss depending on the wavelength range.

Prior art 3 discloses a laminated polarizing glass. The invention of this prior art is directed to a polarizing glass having photochromic properties. Core glasses which can be used are only potentially polarizing glasses which contain unprecipitated and unstretched metallic particles and hence inevitably contain metallic halide particles. Consequently, light scattering occurs due to the difference in refractive index between the base glass and the metallic halide particles, which results in the transmission loss thereof.

Further, to avoid the break occurring due to the presence of tensile stress near the surface, the core glass is coated with a glass having a much lower viscosity. Thus, one of the characteristics of such glasses is that the coating glass is different in composition from the core glass. However, when the coated glass, i.e., surface glass has a composition different from that of a core glass, both glasses are generally differ in refractive index and the reflection loss occurs at the interface of the both glasses due to the difference in refractive index therebetween. This is another factor which may bring out the transmission loss of light.

As explained above, conventional polarizing glasses exhibit a large transmission loss, which is an important problem from the viewpoint of practical use. In particular, when a polarizing glass is to be applied to optical isolators, the transmission loss of a polarizing glass is responsible for the greater part of the total transmission loss of the isolators.

In the polarizing glasses described in the above-cited prior arts, it would be possible to diminish to some degree the transmission loss by applying a longer reduction time, but a satisfactory level of the transmission loss could not be obtained. Further, the longer reduction time may lead to a lower productivity and thus is scarcely practicable.

On the other hand, by making the total thickness of a polarizing glass smaller, a thinner layer containing metallic halide particles may be produced, thus enabling to diminish to some degree the transmission loss. Thinner polarizing glass may, however, be poorer in resistance to stress and therefore it may become more difficult to handle such glass and thus it is impracticable. In addition, while ordinary polarizing glass should be polished to improve the precision of the surface, a thinner glass may be disadvantageously unpolishable because its deformation may occur when placed on a polisher plate. As examined by the present inventors, when a polarizing glass disclosed in prior art 2 is imparted with a thickness of 0.3 mm instead of 1 mm, the glass may achieve the diminish of the transmission loss by about 2% while maintaining polarizing properties thereof. Such glass, however, did not have sufficient strength and thus is impracticable.

Therefore, an object of the present invention is to provide a polarizing glass having polarizing properties comparable to conventional counterparts, a largely decreased transmission loss and a strength acceptable to practical use as well as the production process thereof.

SUMMARY OF THE INVENTION

The present invention is directed to a polarizing glass article comprising a glass layer(s) which contains shape-anisotropic metallic particles dispersed therein in an oriented state and a base glass which causes substantially no light scattering, wherein said glass layer(s) is provided on a part or whole of at least one face of said base glass.

The present invention also directed to a process for the production of the polarizing glass article of the present invention mentioned above, which comprises subjecting a composite glass composed of a base glass which causes substantially no light scattering and a glass layer(s) containing shape-anisotropic metallic halide particles dispersed therein in an oriented state, said glass layer(s) being integrally fused to a part or whole of at least one of faces of the base glass, to a reducing treatment to reduce at least a portion of said metallic halide particles into shape-anisotropic metallic particles (the first production process).

The present invention is further directed to a process for the production of the polarizing glass article of the present invention mentioned above, which comprises drawing a glass body containing metallic halide particles together with a glass body causing substantially no light scattering while one of the glass bodies being put on the other and the glass viscosity being maintained above $2 \times 10^6$ poises, but below $7 \times 10^7$ poises, to obtain a composite glass having a glass layer(s) which contains shape-anisotropic metallic halide particles dispersed therein in an oriented state; and subjecting said composite glass to a reducing treatment to reduce at least a portion of said metallic halide particles into shape-anisotropic metallic particles (the second production process).

DETAILED DESCRIPTION OF THE INVENTION

Figure 1:
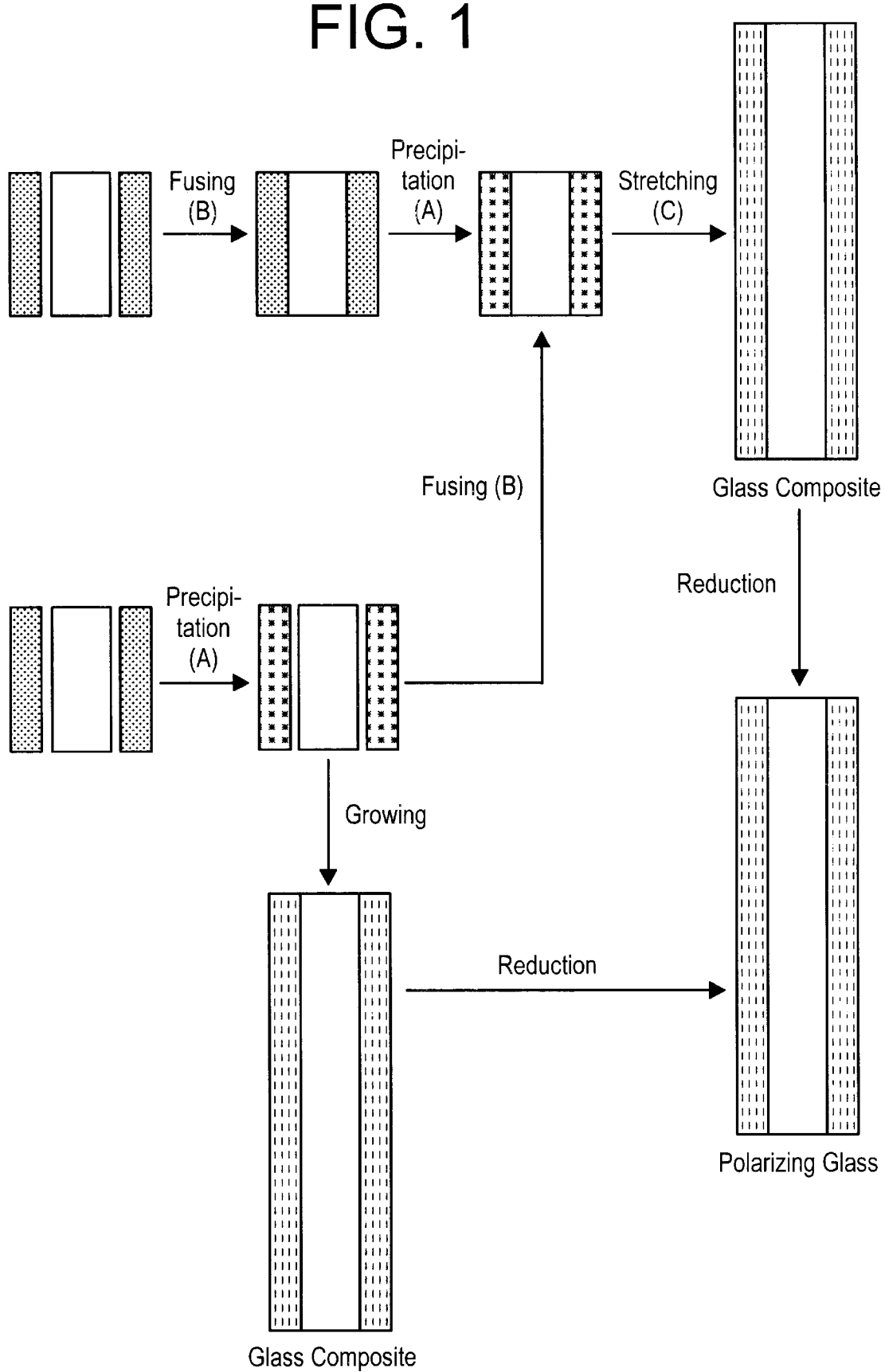
FIG. 1 is a schematic diagram showing the production process of a polarizing glass of the present invention.

The polarizing glass of the present invention is characterized by having a glass layer(s) which contains shape-anisotropic metallic particles dispersed in an oriented state upon a part or whole of at least one face of a base glass which causes substantially no light scattering.

The "shape-anisotropic metallic particles" which may be mentioned are metallic particles, such as Ag or Cu particles, having an aspect ratio of 2:1 to 100:1, preferably 2:1 to 15:1. These metals are illustrative only, however, and other metals such as platinum and gold may be used.

The term "aspect ratio" designates a ratio of length to breadth of a metallic particle, the length being a longitudinal dimension of a particle and the breadth being a dimension perpendicular thereto, in other words, the width of a particle.

As to the amount of shape-anisotropic metallic particles dispersed in the glass, this amount expressed by "volume ratio multiplied by thickness" may preferably be below $2 \times 10^{-4}$ mm or less for maintaining a higher transmission rate, but $2 \times 10^{-6}$ mm or more for obtaining a practicable extinction ratio.

In addition, when the glass layer still contains unreduced metallic halide particles, the polarizing glass would have a larger transmission loss. In order to obtain a polarizing glass having a transmission loss applicable to practical use, the amount of metallic halide particles remaining in the above-mentioned glass layer would be preferably restricted below $4 \times 10^{-3}$ mm expressed by volume ratio multiplied by thickness.

When a polarizing glass is a laminated glass composed of two glass layers both containing shape-anisotropic metallic particles, the amount of remaining metallic halide particles should be the total amount in the two layers.

The expression "a base glass causing substantially no light scattering" means a base glass which contains substantially neither metallic particles nor halide particles behaving as precursor thereof. However, particles having a diameter of 10 nm or less would never cause light scattering and hence a base glass which contains metallic particles or halide particles having a diameter of 10 nm or less belongs to "a base glass causing substantially no light scattering".

Embodiments of the polarizing glasses of the present invention include those in which only one of the faces of the base glass causing substantially no light scattering is provided with a glass layer containing shape-anisotropic metallic particles, and those in which both of the faces of the base glass causing substantially no light scattering are provided with a glass layer containing shape-anisotropic metallic particles. The glass layer containing shape-anisotropic metallic particles may be provided partially or wholly over the surfaces of the base glass.

In the polarizing glass of the present invention, it would be preferred that the glass layer containing "shape-anisotropic metallic particles" and the "base glass causing substantially no light scattering" are substantially equal in refractive index. The phrase "substantially equal in refractive index" means that there occurs scarcely a reflection loss due to the difference in refractive index between the glass layer and the base glass. When such difference in refractive index is 0.1 or less, the reflection loss due to this difference could be negligible.

Suitable glasses for use as the glass layer and the base glass in the present invention are silicate glasses, borosilicate glasses, phosphate glasses, fluorophosphate glasses, fluoride glasses and the like. Particularly preferred are borosilicate glasses, in which at least 80% of glass consists of, in terms of weight %, 28 to 65% of $SiO_2$, 13 to 50% of $B_2O_3$, 6 to 13% of $Al_2O_3$, 0 to 5% of $AlF_3$, 7 to 17% of alkaline metal compounds, 0 to 5% of alkali metal chlorides, 0 to 2.5% of the total of copper oxide and copper halides, 0 to 2.5% of the total of silver oxide and silver halides, 0 to 0.6% of SnO and 0 to 5% of $As_2O_3$.

Moreover, in the polarizing glass of the present invention, it may be preferred that the glass layer containing "shape-anisotropic metallic particles" and the "base glass causing substantially no light scattering" are substantially equal in both thermal expansion coefficient and viscosity. The expression "substantially equal in both thermal expansion coefficient and viscosity" refers to the values which, when the glass layer is joined to the base glass, might not produce such stress as generating crack in the glass. A difference in thermal expansion coefficient of at most $10 \times 10^{-7}/°C$. and a logarithmically calculated difference in viscosity of at most 0.3 would be generally acceptable.

In order to make the base glass and the glass layer substantially equal in thermal expansion coefficient and in viscosity, the difference of the composition between the both glasses should satisfy the requirements that the difference of contents of each constituents is limited to 5% at most, except the metallic particles contained in the glass layer.

In the polarizing glass of the present invention, the glass layer containing "shape-anisotropic metallic particles" has preferably a thickness of 0.4 mm or less. When the polarizing glass is composed of two of the glass layers, the both glass layers have preferably a thickness of 0.2 mm or less. By selecting a thickness in the above-defined range, remaining amount of the metallic halide particles in the glass layer may be limited by the usual reduction conditions to such amount that light scattering is restricted within the practicably acceptable range.

On the other hand, it may be preferred that the total thickness of (one or two of) the glass layer(s) and the base glass, in other words, the thickness of the polarizing glass is 0.5 mm or more, with a view to keep a practicably acceptable strength.

The process for the production of a polarizing glass of the present invention will now be described with reference to FIG. 1. FIG. 1 is a schematic diagram showing an example of the production process of a polarizing glass having two glass layers which contain shape-anisotropic metallic particles.

In the first production process, prepared is a composite glass composed of a glass plate containing shape-anisotropic metallic halide particles dispersed therein in an oriented state, which is integrally fused to a part or whole of at least one of faces of a glass plate causing substantially no light scattering.

More specifically, this composite glass may be prepared, e.g., by the procedure shown in the second row of FIG. 1 which comprises the steps of: (A) precipitating the metallic halide contained in the glass plate into the form of metallic halide particles; (B) integrally fusing glass plates (two sheets) containing metallic halide particles to a glass plate causing substantially no light scattering; and thereafter (C) stretching the resulting glass plate having the glass layers which contain metallic halide particles.

The above-mentioned three steps would preferably be performed in the sequence as above.

If the step (C) of stretching a glass plate precedes the step (B) of fusing the glass plates integrally, it may be likely to happen that metallic halide particles are deformed in the course of the fusion or that the stretched particles return the original shape, so that the temperature control is often difficult.

The step (B) of integrally fusing a glass plate containing metallic halide particles to a glass plate causing substantially no light scattering may be preferably carried out at a temperature exceeding the yielding point of at least one of the glasses by 0° to 250° C. At the temperature exceeding the yielding point by more than 250° C., and the softening rate of glasses would disadvantageously be quickened to result in glass deformation. On the other hand, at the temperature below the yielding point, satisfactory fusion of glasses could not be achieved.

The composite glass could be prepared also in a different sequence from that as described above.

As shown in the first row in FIG. 1, for example, a composite glass may be prepared, e.g., by the sequence which comprises the steps of: (B) integrally fusing a glass plate containing metallic halide particles to a glass plate causing substantially no light scattering; (A) precipitating the metallic halide contained in the glass plate into the form of metallic halide particles; and thereafter (C) stretching the resulting glass plate having the glass layers which contain metallic halide particles.

Alternatively, the step (A) of precipitating the metallic halide contained in the glass plate into the form of metallic halide particles may be carried out simultaneously with the step (B) of integrally fusing a glass plate containing metallic halide particles to a glass plate causing substantially no light scattering.

Halogens which may be contained in the metallic halides include chlorine, bromine and iodine. Metallic halides which may be mentioned are silver chloride, silver bromide, silver iodide, copper chloride, copper bromide, copper iodide, gold chloride, gold bromide, gold iodide, platinum chloride, platinum bromide, platinum iodide and the like. Glasses containing metallic halide particles dispersed therein can be easily prepared by any of conventional processes.

In the glass plate causing substantially no light scattering, the expression "substantially containing no metallic particles nor metallic halide particles" means that the glass plate does not contain any metallic particles nor metallic halide particles except those which are involved in the composition of the glass plate as impurities.

The reduction treatment of the glass composite may be conducted by applying conventional process in the conventional conditions as such. With a view to diminish the light scattering, it may be preferred to reduce metallic halide particles contained near the surface of the glass plate into shape-anisotropic metallic particles as much as possible, thus restricting the amount of remaining metallic halide particles below the above-defined $4 \times 10^{-3}$ mm expressed as volume ratio multiplied by thickness.

The reduction treatment may be conducted by, e.g., heat treating the glass composite in an atmosphere of reducing gas. Reducing gases which may be used are gaseous hydrogen, $CO-CO_2$ gas and the like. Reduction conditions may be varied depending on the nature of metallic halides to be reduced. Reduction temperature should be determined by considering that an excessively high temperature may cause the reduced metallic particles to return to a spherical shape. When copper halide is used for example, a temperature of about 350° to 550° C. would be properly selected. Reduction time may be determined as appropriate by taking together the temperature and the degree of reduction into consideration, and usually may be 30 minutes to 10 hours.

According to the second production process of the present invention, stretching process, particularly drawing process is used.

Drawing is carried out on the both glass bodies simultaneously while putting one of the glass body containing metallic halide particles and the glass body causing substantially no light scattering on the other. In order to produce a polarizing glass wherein the base glass causing no light scattering is provided on the both surfaces with a glass layer containing shape-anisotropic metallic halide particles dispersed in an oriented state, drawing is carried out, while putting a glass body containing metallic halide particles on each of opposite faces of a glass body causing substantially no light scattering, on the whole glass.

By using the drawing process, fusion and stretching of glass bodies can be performed simultaneously, while avoiding the glass break, a composite glass which is a precursor of a polarizing glass can be obtained in a reliable manner as described below.

Drawing is conducted while maintaining the glass viscosity above $2 \times 10^6$ poises, but below $7 \times 10^7$ poises. By drawing a glass having a viscosity of the above-defined range, the glass could be stretched while preventing the glass from breaking. Therefore, the drawing is carried out in the condition that imparts the viscosity of the above range to both of the glass containing metallic halide particles and the glass causing substantially no light scattering.

When a viscosity is below $2 \times 10^6$ poises, metallic halide particles might reach the temperature of heat treatment for precipitation thereof so that metallic particles are forced to grow in the course of stretching, hence a lengthy polarizing glass having uniform polarizing properties in the longitudinal direction thereof could not be obtained by drawing. Experiments have further proved that, when the glass had such a low viscosity, it was difficult to apply enough stress (tensile force) to stretch halide particles. On the other hand, at a viscosity above $7 \times 10^7$ poises, glass may fail to reach the softening temperature thereof and thus the probability of occurrence of breaking during drawing may disadvantageously increased.

The viscosity of glass during drawing is preferably in the range of $7 \times 10^6$ poises to $4 \times 10^7$ poises. Since the viscosity of glass may vary with the nature and the temperature of the glass, the temperature that imparts to the glass the viscosity in the above-defined range could be suitably selected depending on the nature of the glass.

The degree of drawing may suitably be selected depending on the desired aspect ratio of metallic halide particles. This aspect ratio can be in turn determined as appropriate by considering the desired aspect ratio of the metallic particles to be obtained after reduction. By way of example, by selecting metallic halide particles having an aspect ratio of 10:1 to 500:1, metallic particles having an aspect ratio of 2:1 to 100:1 can be obtained.

Owing to the thickness as low as 0.5 mm or less imparted to the drawn composite glass containing shape-anisotropic metallic particles, the composite glass could be cooled with an exceptionally high efficiency and thus it is possible to prevent the elongated metallic halide particles from returning to a spherical shape. The thickness of the drawn glass may be more preferably 0.1 mm to 0.4 mm. Moreover, by imparting the thickness of 0.4 mm or less to the drawn composite glass, in the subsequent reduction treatment, metallic halide particles could be relatively easily reduced to metallic particles, thus advantageously diminishing the content of remaining metallic halide particles and decreasing the transmission loss.

From the viewpoint that the end use of the composite glass is an optical isolator, it has preferably a cross-section in the form of rectangle or rough rectangle. The term "rough rectangle" herein includes ellipse, too. The cross-sectional shape may be suitably selected depending on the shape required of the polarizing glass as final product. The term "rectangle" generally means regular square or rectangle.

The above-mentioned drawing step may be carried out preferably in such a state that a stress of 50 kg/cm$^2$ to 600 kg/cm$^2$ is applied to a glass. The drawing under the stress of this range makes it possible to prevent the glass from breaking and to elongate metallic halide particles to a desired degree. With a stress of less than 50 kg/cm$^2$, metallic halide particles are unable to be elongated to reach an aspect ratio of 10:1 or more, and thus it is difficult to obtain a polarizing glass having the absorption peak wavelength in the infrared area. On the other hand, with a stress exceeding 600 kg/cm$^2$, the glass may be applied with a stress exceeding the maximum practical breaking force, and thus the glass break tends to be likely to occur.

By carrying out the drawing in the above-defined conditions, a composite glass provided with a glass layer containing metallic halide particles having a desired aspect ratio dispersed therein can be obtained. Metallic halide particles should be reduced to metallic particles in the subsequent step, and particles decrease the volume thereof during such reduction. Accordingly, the aspect ratio of metallic halide particles may be preferably determined by considering the aspect ratio to be obtained after reduction.

According to this process, concerning the refractive index, the thermal expansion coefficient and the softening temperature of glass bodies, the matching may be possible between respective glasses and thus a heat-fused face causing no reflection loss nor distortion could be obtained. Alternatively, it may be possible to prepare a glass having the same composition as the polarizing glass exclusive of metallic halide particles and the obtained glass may be used as the glass plate containing no metallic halide particles.

Figure 2:
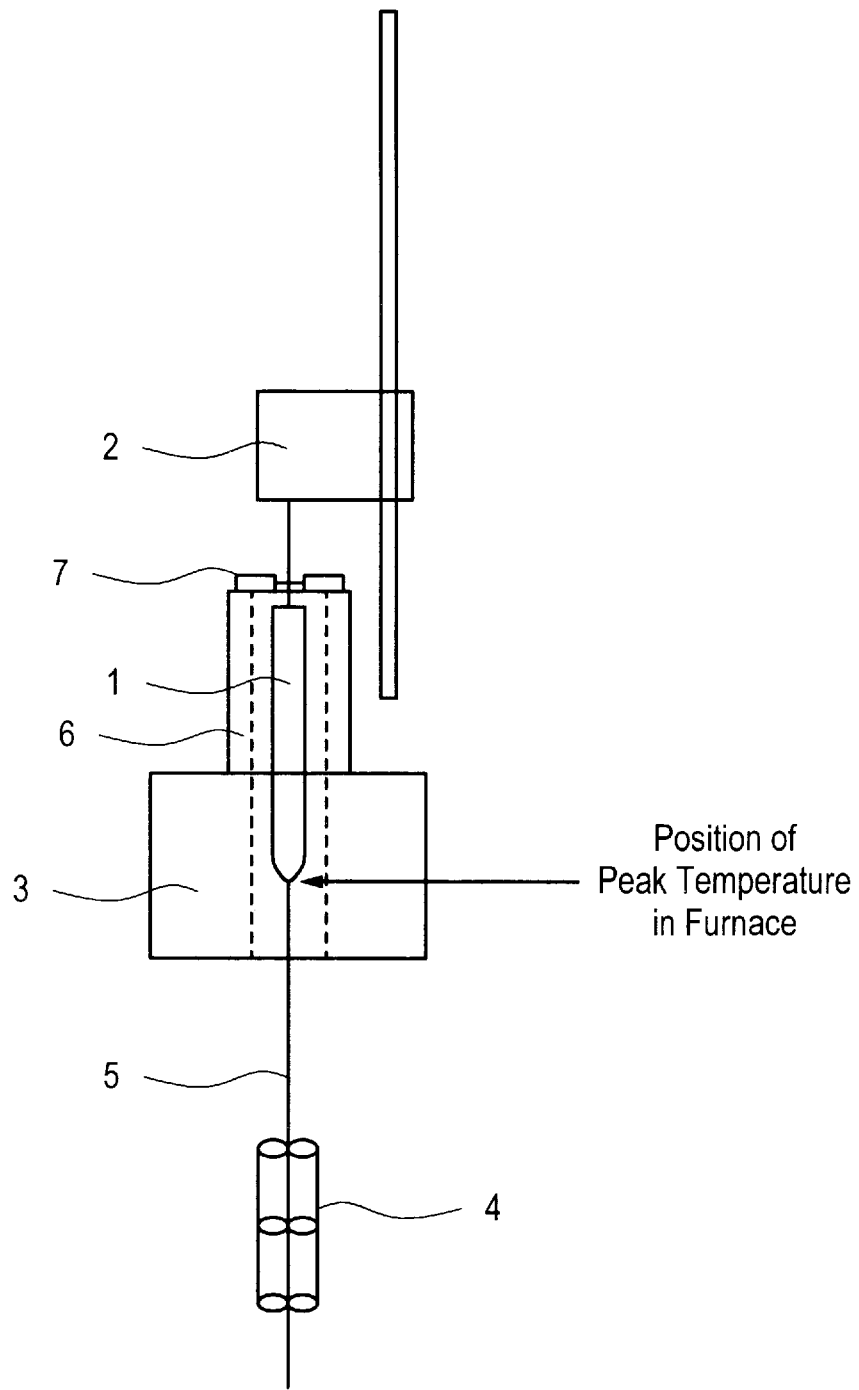
FIG. 2 is a schematic view showing the drawing apparatus applied in the process of the present invention.

An embodiment of the drawing apparatus adapted for use in the present invention is shown in FIG. 2.

In FIG. 2, reference numeral 1 designates a glass preform composed of a glass body containing metallic halide particles and a glass body which occur substantially no light scattering, both being placed adjacent each other.

Faces of the glass bodies to be thermally fused has preferably been optically polished. Preferably, the faces which are to constitute the surfaces of the resulting composite glass (faces opposite to those which are to be fused together through drawing) have also been polished.

Preform 1 is held under feeding device 2 by means of a wire in a manner downwardly displaceable. Preform 1 is softened around the tip thereof in heating furnace 3 and is drawn downwardly from the forward end thereof by means of pulling device 4. As a result of that drawing, the glass preform is converted into tape-shaped composite glass 5 having a glass layer in which elongated metallic halide particles are dispersed. Tape-shaped composite glass 5 continues to proceed to be discharged out of heating furnace 3 and then quickly quenched with external air.

To cylindrical hood 6 situated above heating furnace 3 is attached upper lid 7 which is provided with an opening for the passage of the wire which connects feeding device 2 with the preform 1. Hood 6 and lid 7 are effective to prevent the glass from breaking due to a sudden increase of temperature and to avoid the heat dispersion out of heating furnace 3. The internal temperature of heating furnace 3 is controlled by means of a temperature control unit not shown, so that the viscosity of the preform 1 placed in heating furnace 3 may be suitably controlled.

By controlling the feeding speed of feeding device 2 as well as the pulling rate and the tensile force applied by pulling device 4, tape-shaped glass 5 provided with a glass layer could be obtained, in which glass layer metallic halide particles having a desired aspect ratio are dispersed.

The drawing furnace employed in the drawing process of the present invention has preferably Gaussian temperature distribution.

Figure 3:
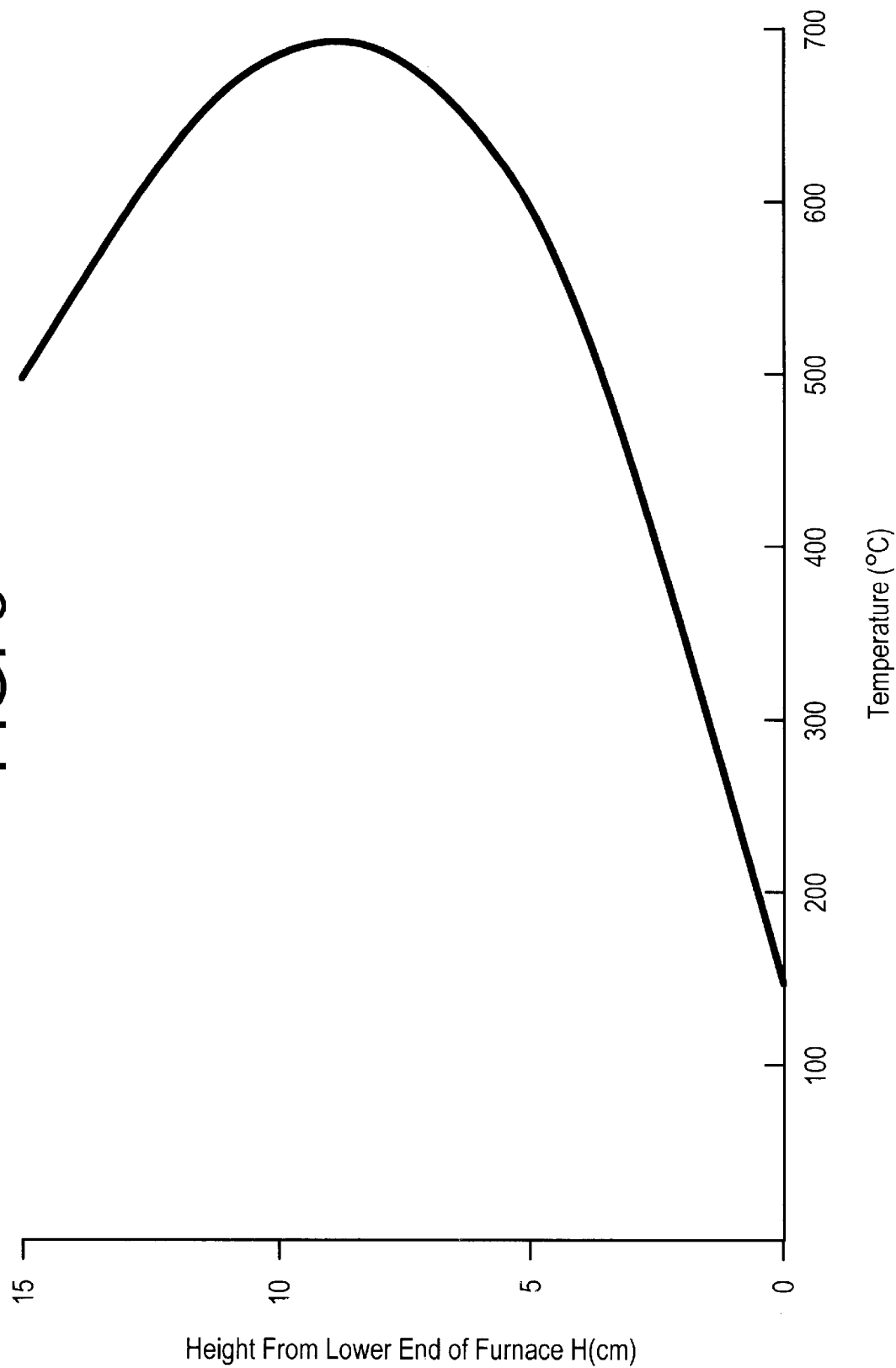
FIG. 3 is a graph showing a Gaussian temperature distribution.

A Gaussian temperature distribution is shown in FIG. 3. In a drawing furnace having Gaussian temperature distribution, a large deformation may be possible by positioning the peak temperature point of the furnace at the point where the deformation of preform occurs. Since the internal temperature of the furnace becomes lower as the distance from the peak temperature point increases, a composite glass can be rapidly decreased in temperature as it moves. At the peak temperature point, glass could be stretched while keeping a viscosity causing no glass breaking due to stretching. Moreover, rapid cooling can effectively prevent the stretched metallic halide particles from returning to a spherical shape.

Since the cooling rate of a composite glass may vary with the temperature distribution in the furnace and the drawing rate, suitable conditions could be determined by compromising the both as appropriate. Preferably, the composite glass obtained after drawing is moved within 120 seconds from the point where the glass starts to be deformed to the point that is surrounded by an atmosphere of 100° C. More preferably, the composite glass is moved to the point that is surrounded by an atmosphere of 100° C. within 60 seconds.

In addition, the cooling rate of the composite glass obtained after drawing depends on the total thickness of the composite glass.

Thus, the total thickness may be suitably 2 mm or less, preferably 1 mm or less.

The optical isolator of the present invention will now be described.

Figure 4:
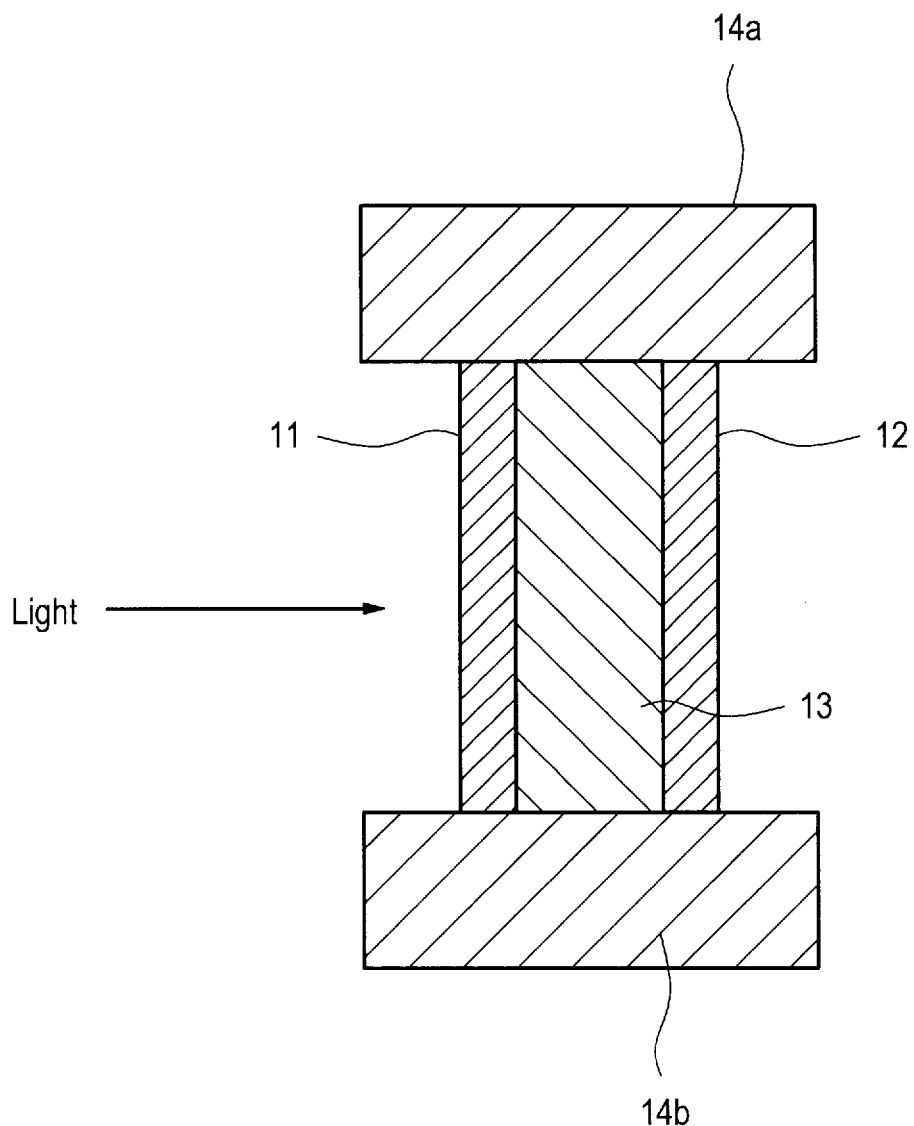
FIG. 4 is a schematic view of an isolator of the present invention.

The optical isolator of the present invention comprises a Faraday rotational element and at least one polarizer as components thereof, preferably comprises a Faraday rotational element, two polarizers and a magnet as components thereof, the polarizer being made of polarizing glass of the present invention as described above. FIG. 4 is a schematic view of an isolator composed of polarizing glasses 11 and 12, magnetic garnet membrane 13 and magnets of Sm-Co series 14a and 14b. Incident light falls upon the side of polarizing glass 11.

The isolator of the present invention is an exceptionally excellent optical isolator having an improved isolator ratio as well as a decreased transmission loss.

The nature and the size of metal contained in the polarizing glass as well as the aspect ratio thereof can be modified as appropriate depending on the wavelength to be polarized.

According to the invention, there can be provided a polarizing glass having comparable polarizing properties to conventional polarizing glasses together with a largely decreased transmission loss and practicable strength as well as the production process thereof.

Moreover, by making substantially equal the thermal expansion coefficient, refractive index and viscosity of the base glass and the glass layer containing shape-anisotropic metallic particles, it may be possible to prevent the reflection loss from occurring at the interface of the glasses due to the difference in refractive index therebetween and, further, it is possible to easily join them with causing no stress at the interface of the glasses.

The first production process of the present invention makes it possible to produce a polarizing glass with a relatively simple process, enabling a lower investment to the apparatus. In addition, by piling preforms as stock, quick response on demand could be possible.

Further, by selecting the temperature for the integral fusion at a temperature higher than the glass yielding point by 0° to 250° C., reliable integral fusion could be possible.

According to the second production process employing drawing procedure, it could be possible to fuse and stretch the glass bodies simultaneously and to reliably obtain a composite glass which is a precursor of a polarizing glass, while preventing the glass from breaking as described below.

EXAMPLES

The examples of the present invention will be described in detail with reference to accompanying drawings.

In these examples, a glass layer containing halide particles of Cu or Ag is referred to as surface glass, whereas a base glass containing substantially no halide particles of Cu or Ag is referred to as core glass.

EXAMPLE 1

In order to prepare a glass having the composition consisting of, in terms of weight %, 57.5% of $SiO_2$, 19.5% of $B_2O_3$, 8.9% of $Al_2O_3$, 2.0% of $AlF_3$, 9.8% of $Na_2O$, 1.4% of NaCl, 0.8% of CuCl and 0.1% of SnO, a starting material including $SiO_2$, $H_3BO_3$, $Al(OH)_3$, $Na_2CO_3$, NaCl, $AlF_3$, CuCl, SnO and others was introduced into a 3-liter platinum crucible and melted by heating at 1,450° C., and then the molten material was cast into a graphite mold and gradually cooled to room temperature. The resultant glass was heat treated for 1 hour at 700° C. to precipitate copper halide particles of about 70 nm. A specimen of 1×10×100 mm was cut out to obtain a surface glass. Another glass was prepared having the composition as defined above excluding CuCl, from which a specimen of 4×10×100 mm was cut out to obtain a core glass. Both glasses had a yielding point of 550° C.

Figure 5:
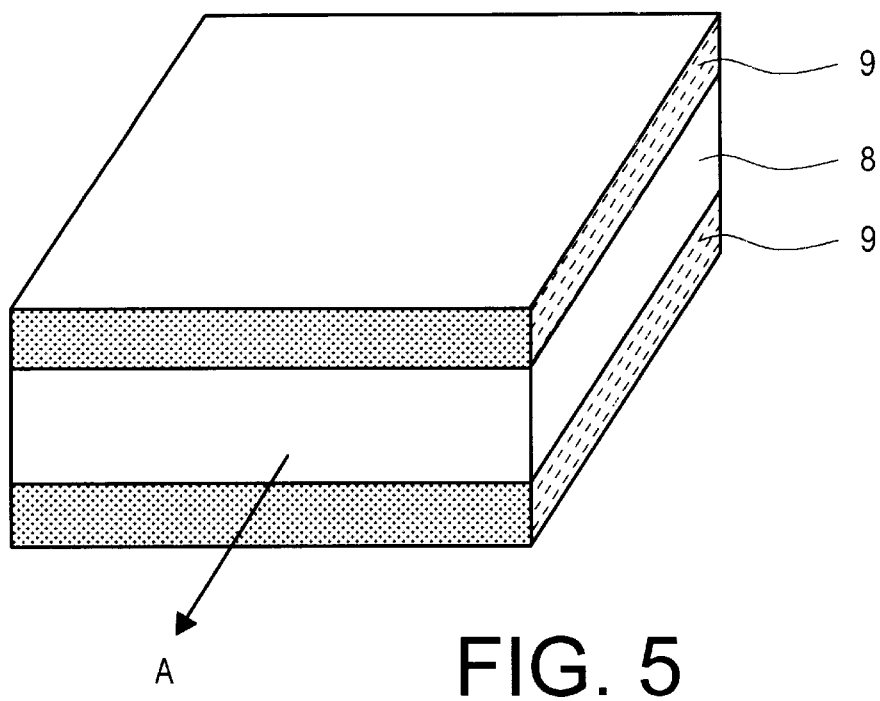
FIG. 5 is a perspective view showing the fusion of core glass with surface glass in the Examples 1, and 3 to 6.

The obtained glasses were subjected to surface polishing and then one sheet of core glass 8 was placed between two sheets of surface glass 9 as shown in FIG. 5 and held at 650° C. for 20 minutes to fuse them together.

Thus obtained glass preform, while holding the temperature near the lower end thereof at 600° C. (temperature which imparted a viscosity of $2 \times 10^9$ poises to both of the surface glass and the core glass), was stretched in the direction indicated by the arrow A at a speed of 150 mm/minute under an average stress of 400 kg/cm², until the glass preform reached a cross-section of 1.2×2.0 mm.

Then, the resultant glass was surface polished to remove a thickness of 0.1 mm from both faces thereof, thus giving to the glass a thickness of 1 mm (each surface glass was 0.1 mm thick and core glass was 0.8 mm thick). Thereafter, this glass was subjected to reduction at 400° C. for 3 hours in an atmosphere of hydrogen to precipitate metal copper particles (aspect ratio of 6:1) to give a polarizing glass of the present invention. The obtained polarizing glass had a extinction ratio and a transmission loss at the wavelengths at 1.31 μm and 1.55 μm shown in Table 1.

COMPARATIVE EXAMPLE 1

A polarizing glass of 1 mm thick containing metal copper particles (aspect ratio of 6:1) dispersed in an oriented state therein was produced in the similar conditions to those of Example 1, except that the starting material was consisted of a surface glass only. The polarizing properties were measured in the same manner as in Example 1. The results are shown in Table 1.

TABLE 1

| | Wavelength 1.31 μm | | Wavelength 1.55 μm | |
| --- | --- | --- | --- | --- |
| | Extinction ratio | Transmission loss | Extinction ratio | Transmission loss |
| Example 1 | 65 dB | 0.03 dB | 65 dB | 0.03 dB |
| Comparative Example 1 | 65 dB | 0.04 dB | 65 dB | 0.04 dB |
| Reduced ratio of transmission loss | — | 25% | — | 25% |

Aspect ratio was determined, while observing metallic particles on an electron microscope, by randomly selecting 100 particles, then measuring the ratio of length versus breadth of each particle and averaging the results. The transmission loss of a polarizing glass with AR coat was calculated by substituting the measured transmission rate Tp for the following equation:

Transmission loss $L = -10 \times \log_{10} (Tp/100)$

In order to determine the extinction ratio, by rotating a sample while irradiating the sample with a linear polarized light, the transmission rate (Tp %) of a irradiated light having a polarizing plane perpendicular to the longitudinal axis of particle and the transmission rate (Th %) of a irradiated light having a polarizing plane parallel to the longitudinal axis of particle were measured and the measured values were substituted for the following equation to calculate the extinction ratio:

Extinction ratio $E = +10 \times \log_{10} (Tp/Th)$

From the results shown in Table 1, it may be noted that the polarizing glass of the present invention have achieved an improvement of transmission loss of 25% relative to the conventional polarizing glass (Comparative Example 1).

EXAMPLE 2

In order to prepare a glass having the composition consisting of, in terms of weight %, 57.5% of $SiO_2$, 19.5% of $B_2O_3$, 8.9% of $Al_2O_3$, 2.0% of $AlF_3$, 9.8% of $Na_2O$, 1.4% of NaCl and 0.8% of AgCl, a starting material including $SiO_2$, $H_3BO_3$, $Al(OH)_3$, $Na_2CO_3$, $NaNO_3$, NaCl, $AlF_3$, AgCl and others was introduced into a 3-liter platinum crucible and melted by heating at 1,450° C., and then the molten material was cast into a graphite mold and gradually cooled to room temperature. The resultant glass was thermally treated for 1 hour at 700° C. to precipitate silver halide particles of about 70 nm. A specimen of 2×10×100 mm was cut out to obtain a surface glass. Another glass was prepared having the composition as defined above excluding AgCl, from which a specimen of 4×10×100 mm was cut out to obtain a core glass. The both glasses had a yielding point of 550° C.

Figure 6:
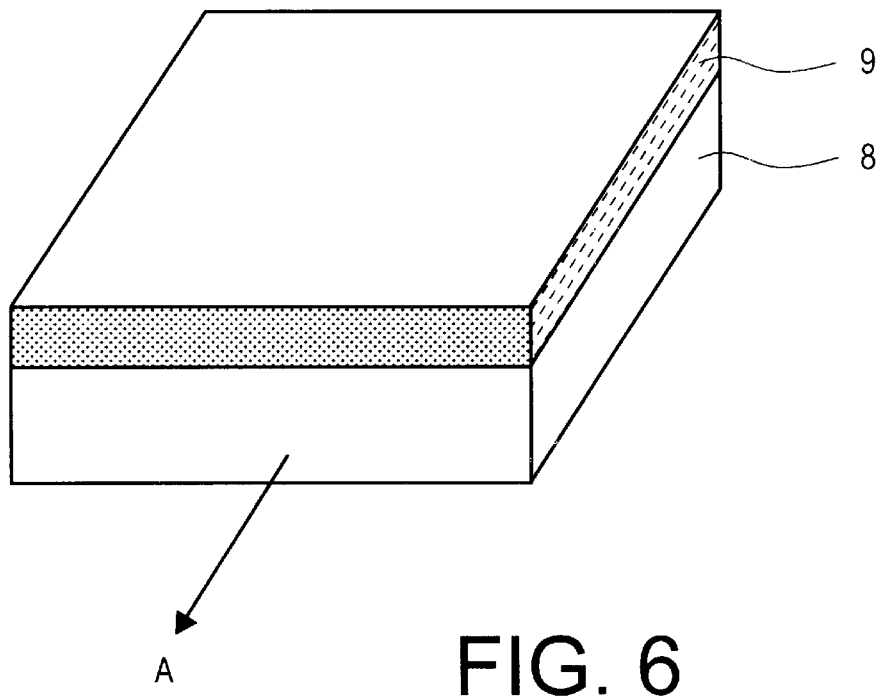
FIG. 6 is a perspective view showing the fusion of core glass with surface glass in the Example 2.

The obtained glasses were subjected to surface polishing, and then surface glass 9 was overlaid on core glass 8 as shown in FIG. 6 and held at 650° C. for 20 minutes to fuse them together.

Thus obtained glass preform, while holding the temperature near the lower end thereof at 600° C. (temperature which imparted a viscosity of $2 \times 10^9$ poises to both of the surface glass and the core glass), was stretched in the direction indicated by the arrow A at a speed of 150 mm/minute under an average stress of 400 kg/cm², until the glass preform reached a cross-section of 1.2×2.0 mm.

Then, the resultant glass was surface polished to remove a thickness of 0.1 mm from both faces thereof, thus giving to the glass a thickness of 1 mm (surface glass was 0.3 mm thick and core glass was 0.7 mm thick). Thereafter, this glass was subjected to reduction at 440° C. for 6.8 hours in an atmosphere of hydrogen to precipitate metal silver particles (aspect ratio of 6:1) to give a polarizing glass of the present invention. The obtained polarizing glass had a extinction ratio and a transmission loss at wavelengths of 1.31 μm and 1.55 μm shown in Table 2.

COMPARATIVE EXAMPLE 2

A polarizing glass of 1 mm thick consisted of a surface glass only and containing metal silver particles (aspect ratio of 6:1) dispersed therein in an oriented state was produced in the similar conditions to those of Example 2, except that the reducing time was set 1.7 hours to obtain a reduced layer of the same total thickness.

The polarizing properties were measured in the same manner as in Example 2. The results are shown in Table 2.

TABLE 2

|  | Wavelength 1.31 μm | | Wavelength 1.55 μm | |
| --- | --- | --- | --- | --- |
|  | Extinction ratio | Transmission loss | Extinction ratio | Transmission loss |
| Example 2 | 65 dB | 0.025 dB | 65 dB | 0.025 dB |
| Comparative Example 2 | 65 dB | 0.04 dB | 65 dB | 0.04 dB |
| Reduced ratio of transmission loss | — | 37.5% | — | 37.5% |

EXAMPLES 3 to 6

In each of these examples, a polarizing glass was produced in a manner similar to that of Examples 1 and 2, and aspect ratio and transmission loss at the wavelengths of 1.31 μm and 1.55 μm were determined in the same way as Examples 1 and 2. Table 3 shows the compositions of surface glass and core glass produced in each of these examples, Table 4 shows the conditions where each polarizing glass was produced and Table 5 shows polarizing properties thereof. In these tables, viscosity was determined by the penetration method, according to which the rate of penetration of a pusher into a glass was measured.

TABLE 3

|  | Example 3 | | Example 4 | | Example 5 | | Example 6 | |
| --- | --- | --- | --- | --- | --- | --- | --- | --- |
|  | Surface Glass | Core Glass | Surface Glass | Core Glass | Surface Glass | Core Glass | Surface Glass | Core Glass |
| $SiO_2$ | 57.6 | 58.0 | 59.6 | 60.2 | 59.7 | 60.3 | 30.0 | 30.3 |
| $B_2O_3$ | 19.5 | 19.7 | 20.0 | 20.0 | 20.0 | 20.0 | 48.7 | 49.2 |
| $Al_2O_3$ | 8.9 | 9.0 | 6.8 | 6.9 | 6.8 | 6.9 | 10.0 | 10.1 |
| $AlF_3$ | 2.0 | 2.0 | 2.0 | 2.0 | 2.0 | 2.0 |  |  |
| $Na_2O$ | 9.8 | 9.9 | 9.7 | 9.8 | 9.7 | 9.8 | 9.0 | 9.1 |
| NaCl | 1.4 | 1.4 | 1.0 | 1.0 | 1.0 | 1.0 | 1.0 | 1.0 |
| CuCl |  |  | 0.8 |  |  |  | 1.0 |  |
| AgCl | 0.8 |  |  |  | 0.8 |  |  |  |
| SnO |  |  | 0.1 | 0.1 |  |  | 0.1 | 0.1 |
| $As_2O_3$ |  |  |  |  |  |  | 0.2 | 0.2 |
| Yield point (°C.) | 550 | 550 | 555 | 555 | 555 | 555 | 540 | 540 |
| Refractive index | 1.473 | 1.470 | 1.474 | 1.471 | 1.474 | 1.471 | 1.483 | 1.480 |

TABLE 4

| | Example 3 | Example 4 | Example 5 | Example 6 |
|---|---|---|---|---|
| Heat treatment temperature (°C.) | 700 | 800 | 800 | 750 |
| Heat treatment period (hour) | 1 | 3 | 3 | 1 |
| Diameter of metallic halide (nm) | 70 | 150 | 150 | 150 |
| Stretching temperature (°C.) | 600 | 600 | 600 | 620 |
| Viscosity at stretching (poise) | $2 \times 10^9$ | $1 \times 10^9$ | $1 \times 10^9$ | $1 \times 10^9$ |
| Stretching stress (kgf/cm$^2$) | 400 | 200 | 200 | 100 |
| Reducing temperature (°C.) | 400 | 500 | 500 | 500 |
| Reducing period (hour) | 3 | 1 | 1 | 4 |
| Fusing temperature (°C.) | 600 | 650 | 680 | 650 |
| Viscosity at fusing (poise) | $2 \times 10^9$ | $9 \times 10^7$ | $2 \times 10^7$ | $1 \times 10^8$ |
| Thermal expansion coefficient ($10^{-7}$/°C.) | 57 | 56 | 56 | 60 |

* As to viscosities at stretching and fusing, indicated are those of core glasses.

TABLE 5

| | 3 | | 4 | | 5 | | 6 | |
|---|---|---|---|---|---|---|---|---|
| | Example | Comparative Example | Example | Comparative Example | Example | Comparative Example | Example | Comparative Example |
| Aspect ratio | 6:1 | 6:1 | 10:1 | 10:1 | 10:1 | 10:1 | 3:1 | 3:1 |
| Extinction ratio (dB) | | | | | | | | |
| 1.31 μm | 63 | 63 | 24 | 24 | 24 | 24 | 59 | 59 |
| 1.55 μm | 63 | 63 | 30 | 30 | 30 | 30 | 19 | 19 |
| Loss (dB) | | | | | | | | |
| 1.31 μm | 0.03 | 0.05 | 0.05 | 0.08 | 0.05 | 0.08 | 0.10 | 0.35 |
| 1.55 μm | 0.03 | 0.05 | 0.03 | 0.05 | 0.03 | 0.05 | 0.12 | 0.45 |

While the stretching method only is described in the examples to increase the aspect ratio of metallic halide particles, the extrusion method may also be applied in the present invention. However, the drawing method can enable to elongate metallic halide particles having a smaller size, thus improve the loss in the region having a shorter wavelength and hence is more preferable to be applied.

Conditions for the precipitation of metallic halide, conditions for the fusion of surface glass to core glass, conditions for the stretching as well as conditions for the reduction may vary depending on the glass composition defined above. Concerning the conditions for the fusion of core glass with surface glass, the temperature for the fusion should be higher than the yielding point of at least one of the glasses by 0° to 250° C., preferably by 50° to 100° C. The stretching may preferably be carried out at the temperature that imparts to the glass a viscosity of $1 \times 10^4$ poises to $1 \times 10^{11}$ poises.

EXAMPLE 7

(1) Preparation of Preform

A glass having the composition consisting of 59.9% of $SiO_2$, 2% of $AlF_3$, 6.8% of $Al_2O_3$, 20% of $B_2O_3$, 9.7% of $Na_2O$, 1% of NaCl, 0.8% of CuCl and 0.1% of SnO was heated at 1,410° C. in a 5-liter platinum crucible into a molten state, which was then cast into a mold and gradually cooled at 470° C. to form a glass block. A specimen of a desired size was cut out from the resulting glass block and then heat treated at 765° C. for 60 minutes to obtain a glass containing copper chloride particles having an average particle diameter of about 130 nm. The resulting glass was further processed into a glass plate (20 mm×1 mm×220 mm).

Another glass plate (20mm×6 mm×220 mm) which was untreated by heating (containing no copper chloride particles) was prepared as well.

(2) Drawing

A glass preform was prepared by holding one sheet of the above-prepared glass plate which was untreated by heating between two sheets of the glass plate containing copper chloride particles and then the obtained preform was subjected to drawing in the drawing apparatus shown in FIG. 2.

Preform 1 was attached to feeding device 2 (the upper end of preform 1 was suspended from the lower end of feeding device 2 by means of a wire). Preform 1 was positioned so that the lower end thereof may reach about 50 mm above the bottom end of heating furnace 3. The internal temperature of heating furnace 3 was elevated to 710° C. by means of a temperature controlling unit not shown. (Here, the term "internal temperature" means the peak of temperature and the peak is situated near the midpoint along the height of the furnace. The term "internal temperature" hereinafter means the peak of temperature). A wire was wound around the lower end of preform 1 and, after the internal temperature of furnace 3 had reached the plateau, the glass started to be elongated by putting the wire under load.

The drawn tape-shaped glass was held between the double belt rollers acting as pulling device 4 and the internal temperature of heating furnace 3 was set at 690° C. which was 15° C. higher than the softening temperature of the glass (viscosity of the glass:v=2×10$^7$ poises). After the temperature had reached the plateau, the tape-shaped glass was continuously pulled by applying tensile force to the lower end of the glass by means of the rollers. The feeding speed of feeding device 2 was 6 mm/minute, the pulling rate of pulling device 4 was 60 cm/minute, and the load was 1,600 μ(stress: 100 kg/cm$^2$).

The obtained tape-shaped glass had a cross section having a size of 2 mm×0.8 mm (width×thickness). The mean aspect ratio of the copper chloride particles contained in the surface glass was about 30:1 as observed on a transmission electron microscope.

(3) Reduction

The resulting tape-shaped glass was heat treated at 430° C. for 4 hours in gaseous hydrogen atmosphere to obtain a polarizing glass (average aspect ratio of copper particles was 5:1). This polarizing glass had an extinction ratio of 48 dB (at the wavelength of 1.31 μm). The thickness of each of the surface glasses was 0.1 mm and the base glass constituting the intermediate layer of three-layer structure had a thickness of 0.6 mm. Since the base glass contained substantially no copper chloride particles, there was no light scattering due to the presence of copper chloride particles in the intermediate portion, thus enabling to decrease the transmission loss. The transmission loss at the wavelength of 1.31 μm was 0.10 dB.

COMPARATIVE EXAMPLE 3

In a manner similar to that of Example 1, a glass preform in the form of a plate (20 mm×8 mm×220 mm) containing copper chloride particles having an average particle diameter of 130 nm was prepared. The drawing was carried out in the same way as in Example 7, except that the starting preform was constituted by one sheet of the obtained glass plate and the temperature was 680° C. (which was 5° C. higher than the glass softening temperature), whereby a glass having a cross section of 2.0 mm×0.8 mm was obtained.

The resulting glass was heat treated at 425° C. for 4 hours in a gaseous hydrogen atmosphere to obtain a polarizing glass (average aspect ratio of copper particles was 5:1). This polarizing glass had an extinction ratio of 49 dB (at the wavelength of 1.31 μm). The transmission loss at the wavelength of 1.31 μm was 0.14 dB.

When comparing Example 7 with the Comparative Example 3, the both glasses had approximately equal extinction ratio, but the transmission loss was decreased by 29% in the polarizing glass of the present invention.

What is claimed is:

1. A polarizing glass article comprising at least one glass layer which contains shape-anisotropic metallic particles dispersed therein in an oriented state and a base glass which contains no metallic particles and no metallic halide particles and causes substantially no light scattering, wherein said glass layer is provided on at least a part of at least one face of said base glass, and wherein said shape-anisotropic particles are selected from the group consisting of Ag particles and Cu particles.

2. The polarizing glass article of claim 1 wherein said shape-anisotropic metallic particles have an aspect ratio of 2:1 to 100:1.

3. The polarizing glass article of claim 1 wherein said shape-anisotropic metallic particles have an aspect ratio of 2:1 to 15:1.

4. The polarizing glass article of claim 1 wherein said glass layer and said base glass are substantially equal in refractive index.

5. The polarizing glass article of claim 1 wherein constituent glass of said glass layer and constituent glass of said base glass are substantially equal in thermal expansion coefficient and viscosity.

6. The polarizing glass article of claim 1 wherein the thickness of said glass layer is no more than 0.4 mm and total thickness of the glass layer and the base glass is at least 0.5 mm.

7. A process for the production of the polarizing glass article of claim 1, which comprises subjecting a composite glass composed of a base glass which contains no metallic particles and no metallic halide particles and causes substantially no light scattering and at least one glass layer containing shape-anisotropic metallic halide particles dispersed therein in an oriented state, the glass layer being integrally fused to at least a part of at least one face of the base glass, to a reducing treatment to reduce at least a portion of said metallic halide particles into shape-anisotropic metallic particles.

8. The process of claim 7 wherein said composite glass is prepared by fusing the glass layer to the base glass at a temperature higher than yielding point of either one of said glass layer and the base glass by 0° to 250° C.

9. The process for the production of the polarizing glass of claim 1, which comprises putting a glass body containing metallic halide particles on a glass body which contains no metallic particles and no metallic halide particles and causes substantially no light scattering and simultaneously drawing both glass bodies, the glass viscosity being maintained above $2 \times 10^6$ poises but below $7 \times 10^7$ poises, to obtain a composite glass having a glass layer which contains shape-anisotropic metallic halide particles dispersed therein in an oriented state; and subjecting said composite glass to a reducing treatment to reduce at least a portion of said metallic halide particles into shape-anisotropic metallic particles.

10. The process of claim 9 wherein said drawing is carried out while putting a glass body containing metallic halide particle on each of the opposite surfaces of a glass body which contains no metallic particles and no metallic halide particles and causes substantially no light scattering.

11. The process of claim 9 wherein said glass layer containing shape-anisotropic metallic halide particles of said composite glass after drawing has a thickness of no more than 0.4 mm.

12. The process of claim 9 wherein said composite glass obtained after drawing travels within 120 seconds from the point where the glass starts to be deformed to the point that is surrounded by an atmosphere of 100° C.

13. The process of claim 9 wherein said glass bodies have optically polished faces which are opposite to the faces to be fused after drawing.

14. An optical isolator comprising a Faraday rotational element and at least one polarizer wherein said polarizer is the polarizing glass article of claim 1.

15. The polarizing glass article of claim 1 which comprises two glass layers wherein total thickness of the two glass layers is no more than 0.4 mm and total thickness of the two glass layers and the base glass is at least 0.5 mm.

* * * * *